United States Patent [19]

Kotlyar

[11] Patent Number: 5,197,040
[45] Date of Patent: Mar. 23, 1993

[54] BOREHOLE DATA TRANSMISSION APPARATUS

[76] Inventor: Oleg M. Kotlyar, 1739 Grandview #2, Idaho Falls, Id. 83402

[21] Appl. No.: 860,882

[22] Filed: Mar. 31, 1992

[51] Int. Cl.$^5$ ............................................. G01V 1/40
[52] U.S. Cl. ........................................ 367/84; 367/83
[58] Field of Search ................................... 367/83, 84

[56] References Cited

U.S. PATENT DOCUMENTS 4,734,892 3/1988 Kotlyer .............................. 367/83
4,956,823 9/1990 Russell et al. ....................... 367/84

Primary Examiner—Ian J. Lobo

[57] ABSTRACT

A borehole data transmission apparatus whereby a centrifugal pump impeller(s) is used to provide a turbine stage having substantial pressure characteristics in response to changing rotational speed of a shaft for the pressure pulsing of data from the borehole through the drilling mud to the surface of the earth.

4 Claims, 4 Drawing Sheets

BOREHOLE DATA TRANSMISSION APPARATUS

The United State Government has rights in this invention pursuant to Grant No. DE-FG01-90CE15471 between the U.S. Department of Energy and Oleg M. Kotlyar.

BACKGROUND OF THE INVENTION

The present invention relates to a borehole data transmission apparatus and more particularly to a borehole data transmission apparatus utilizing a centrifugal pump impeller to provide a turbine stage having substantial pressure response characteristics for the pressure pulsing of data from the borehole through the drilling mud to the surface of the earth.

It is well known to transmit measurement data from a measuring instrument at the downhole end of a drill string within a borehole by generating pressure variations within the mud flow passing along the drill string and to retrieve the transmitted data by sensing such pressure variations at the surface. Typically such data includes weight on the bit, RPM, natural gamma, formation resistivity, bottom hole temperature, bottom hole pressure, and virtually any information related to detectable conditions. Such information is usually transmitted from the bottom of the borehole to the surface as a series of hydraulic pulses produced in, and transmitted through, the drilling fluid. The information, in the form of pulses, may be transmitted to the surface without disturbing the normal drilling operations or ceasing the flow of drilling fluid. At the surface, the pressure pulses are detected, usually converted to electrical signals, and processed to provide the sought for information in a useable format.

It is common to create pressure pulses in drilling fluid by periodically interrupting the normal flow of the fluid through the drill string, or diverting a portion of the flow into the annulus of the drill string, to form a series of pulses in the drilling fluid which is normally pressurized and which normally flows down through the drill string and back up the annulus around the outer surface of the drill string.

Thus, for example, a variety of systems have been used to form the pressure pulses and to effect transmission to the surface. In most instances, the pulsing system involves some form of valve so positioned that the entire fluid flow through the drill string also flows through the valve. The recognized difficulty with this arrangement is that the drilling fluid, due to its composition, the rate of flow and volume thereof, tends to be quite abrasive. As a result of the abrasive conditions of the drilling fluid and the fact that the transmission of data may involve a significant number of pulses, the life of the valves is somewhat limited.

A number of U.S. Patents show the use of rotary "turbine-like" valves which include a rotor and a stator. Both the rotor and stator have slots which can be aligned to open the valve and let drilling fluid pass through or misaligned to close the valve and provide a strong resistance to the passing of the drilling fluid. U.S. Pat, No. 4,956,823 of Russell shows a signal transmitter comprising main and secondary impellers angularly displaceable relative to one another in response to a change in load of a generator so as to vary the flow passage area and therefore the pressure drop across the rotating impeller assembly. U.S. Pat. No. 3,705,603 of Hawk refers to "a motor actuated rotary valve" which turns between an open position and a closed position in a rotary fashion. Turbines are also used for generating the electrical power needed to operate the logging-while-drilling apparatus. This is shown in the patents referenced, but is also used with non-rotary valves to create the pres-sure pulses as shown in U.S. Pat. No. 3,737,843 of Le Peuvedic et al. Numerous other patents show the use of turbines for generating power in a downhole logging-while-drilling apparatus and also show the use of rotary turbine-like valves which operated in an open and shut mode for generating the pressure pulses. Those systems shown in the patents referenced which use rotary valves for periodically interrupting a drilling fluid in order to generate pulses are motor actuated with the electrical power generated by a separate turbine motor.

The Applicant of the present invention is also the inventor of a logging-while-drilling tool shown in U.S. Pat. No. 4,734,892 which includes a variable rotation device in the form of a turbine rotor(s) of an axial turbine stage(s) with a changing pressure drop across the stage depending on the rotor rotational speed (RPM). The variability of the turbine rotor RPM is caused by changing of torsional loading torque on the rotor shaft. Such variable rotation of the turbine rotor generates the variable pressure drop across the turbine stage(s) to form the pressure wave signal in the drilling fluid.

The degree of torsional loading required on the rotor shaft in order to generate the pressure wave signal, is a function of the pressure response characteristics of the rotational device. Rotational devices are known which have different pressure response characteristics with respect to rotor rotational speed. A rotational device without significant pressure response characteristic will require significant torsional torque to generate the variable pressure drop across the turbine stage(s) thereby resulting in reducing the useful life of the device due to the friction and stress in the rotor shaft. Alternatively, multiple rotational elements could be configured to provide multiple turbine stages, the cumulative effect thereby creating pressure response characteristics across the several turbine stages. However, the downhole data transmission devices having multiple turbine stages must be of a relatively large axial size in order to generate the required significant pressure response across the several turbine stages for the data transmission.

It is an object of this invention to provide a simple, inexpensive, and compact borehole data transmission device having substantial pressure response characteristics for borehole pulse data transmission.

It is another object of the present invention to provide a borehole data transmission device having substantial pressure response characteristics across the turbine stage(s) thereby minimizing the number of turbine stage(s) required, resulting in a compact data transmission device.

Additional objects, advantages and novel features of the invention will become apparent to those skilled in the art upon examination of the following and by practice of the invention.

SUMMARY OF THE INVENTION

The above and other objects are achieved in accordance with the present invention by the provision of a centrifugal pump arranged in a downhole drilling apparatus whereby the drilling fluid enters the centrifugal pump and is directed radially inward by the pump's impeller(s) and then through an outlet to the drilling bit. The centrifugal pump has significant pressure response characteristics to eliminate the requirement of multiple turbine stages to produce the required pressure pulse to be generated and transmitted to the surface. By changing the rotational speed of a rotating shaft that is connected to the centrifugal pump impellers, the pressure pulse is created of sufficient amplitude to provide a distinct signal that is readily observable at the surface over any background noise. In an alternative embodiment of the present invention, a clutch mechanism is provided to disengage the generator from the rotating shaft to provide for data generation and transmission at a higher frequency.

DETAILED DESCRIPTION OF THE INVENTION

Figure 1:
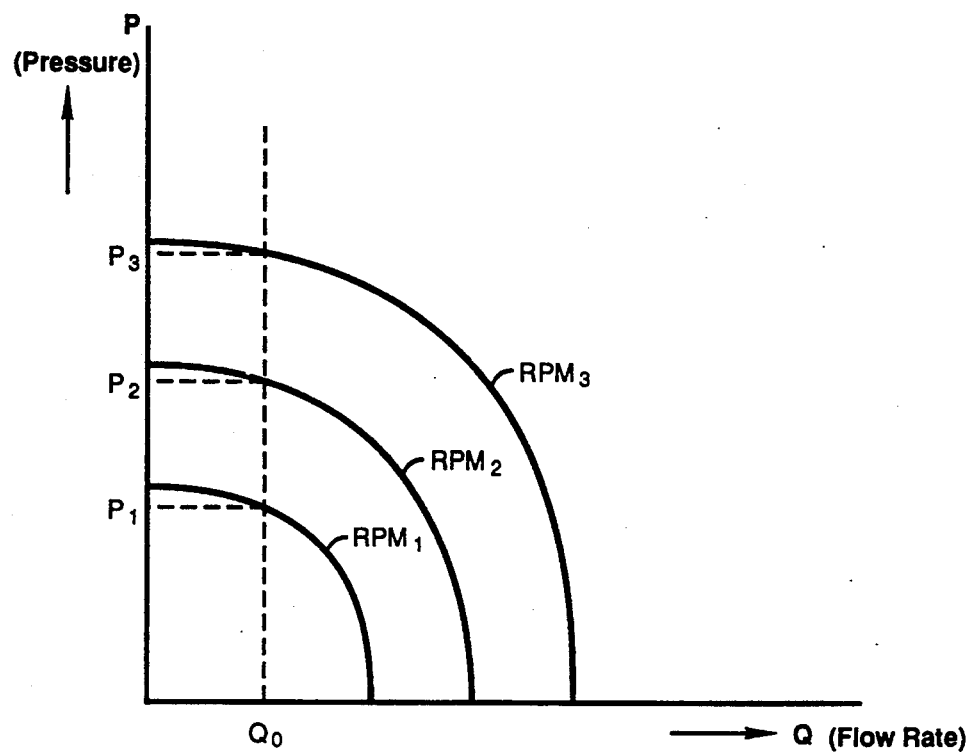
FIG. 1 is a graph illustrating the relationship between changes of pressure (P) and flow rate (Q) of the fluid at different rotational speeds (RPMs) of the centrifugal pump impeller(s).

Referring to FIG. 1, the well known relationship between pressure and flow rates of fluid at different centrifugal impeller(s) rotational speeds (RPM) may be observed. It is shown that a given flow rate $Q_0$ can be obtained at different RPMs but with various output pressures. For instance, at $RPM_1$ a pressure of $P_1$ is observed, while increasing the rotational speed to $RPM_2$ results in an increased pressure $P_2$ being observed. A further increase in rotational speed to $RPM_3$ results in a still further increase in pressure $P_3$. It is this relationship between changing rotational speed and the corresponding change in pressure that is utilized in the present invention to generate and transmit pressure pulses of data to the surface.

Figure 2:
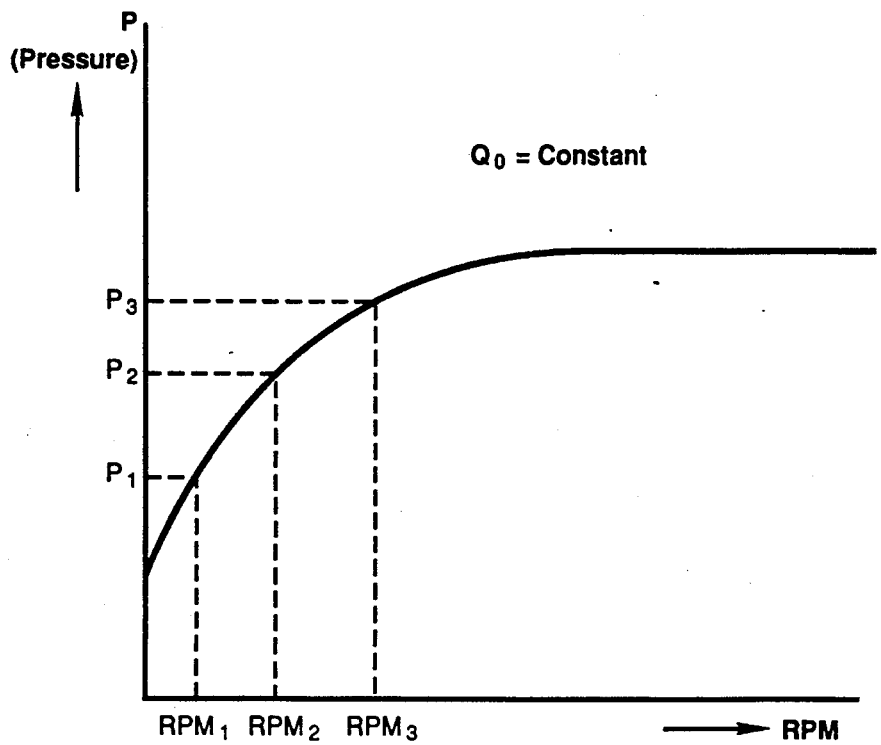
FIG. 2 is a graph illustrating the relationship between changes in pressure with respect to changes in RPM of the centrifugal impeller in a turbine regime at a given constant flow rate $Q_0$.

Referring now to FIG. 2, the relationship between changes in pressure across a centrifugal pump impeller working as a turbine stage is illustrated with respect to rotational speed. As illustrated in FIG. 2, Applicant has observed that a change in RPM of the rotating impellers of a centrifugal pump working in a turbine regime results in a substantial change in pressure across the turbine-like stage of the centrifugal pump. The substantial pressure response characteristics of a centrifugal pump operating in a turbine regime make it ideal for use in a downhole drilling apparatus. The centrifugal pump operated in a turbine regime creates sufficient pressure characteristics to provide a signal to the surface of the earth that can easily be detected over background noise. The more substantial pressure response characteristic of the centrifugal pump also reduces the number of turbine stages that are be required to create sufficient pressure response characteristics needed for the data transmission. Also, by having the significant pressure response characteristics, the centrifugal pump turbine regime requires less abrupt changes in RPM to produce the required change in pressure for data transmission, which serves to prolong the operating life of the downhole data transmissions device.

Figure 3:
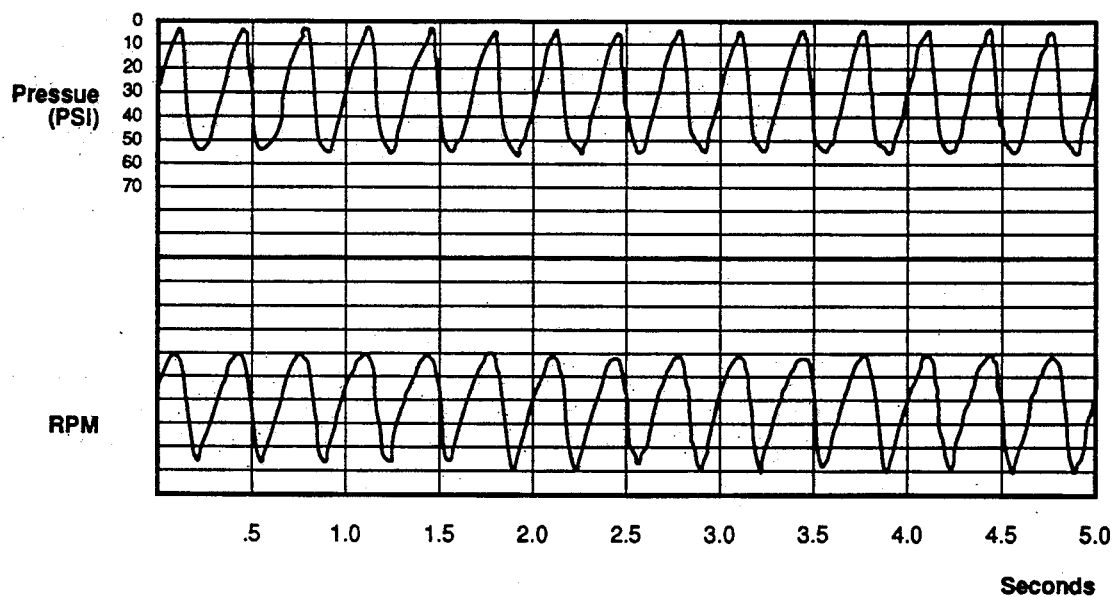
FIG. 3 is a graph illustrating the amplitude of pressure pulse of centrifugal impeller operating in turbine regime at a frequency of 3 Hz.

FIG. 3 illustrates the pressure pulses from one stage of the centrifugal pump operating in a turbine regime at a frequency of 3 Hz. As noted in FIG. 3, a pressure pulse amplitude of approximately 50 psi is observed, which is a sufficient pressure amplitude to provide a distinct signal that is observable at the surface. FIG. 3 also shows the direct relationship between changes in the impeller's RPM and the corresponding changes in pressure.

Figure 4:
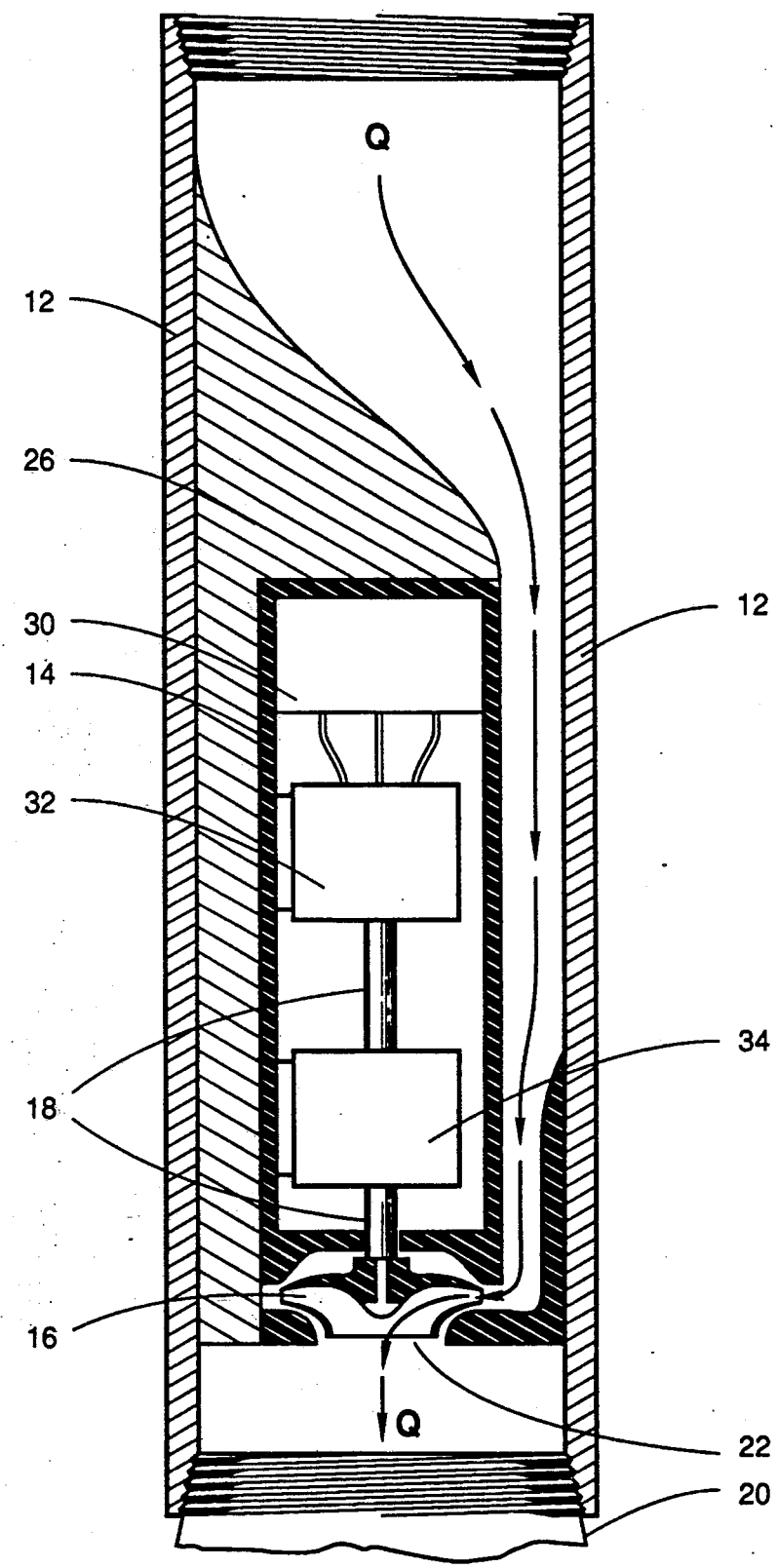
FIG. 4 is a schematic, partly in section, of a portion of the drill string, having the present borehole data transmission apparatus mounted therein.

Referring now to FIG. 4, a borehole data transmission apparatus 10 is positioned within a drill collar 12, which forms the lower end of a drill string near drill bit 20. The borehole data transmission apparatus includes a housing 14 which is sealed from the drilling fluid that flows around the housing and through a centrifugal impeller 16 mounted on a shaft 18 journaled in the housing 14. The housing 14 is permanently attached to drill collar 12 by a housing mount 26, which housing mount also serves to direct the flow of the drilling fluid (Q), as shown by the arrows in FIG. 4. In the preferred embodiment of the present invention the centrifugal impeller comprises the impeller(s) of a centrifugal pump in which the outlet of the centrifugal pump serves as the inlet of the drilling fluid. Since the basic operating principle of a centrifugal pump is to create a significant pressure differential between the inlet port and outlet port, the centrifugal pump rotating elements function effectively to provide the significant pressure response characteristic needed for the pulse data transmission. The centrifugal impeller directs the flow of the drilling fluid radially inward and axially through a downhole outlet 22. The centrifugal impeller is a turbine stage having substantial pressure response characteristics for generating and transmitting pressure pulses through the drilling fluid to the surface of the earth.

Sensors (not shown) of the electronic package 30 sealed within the housing are capable of measuring a desired downhole conditions including inclination, azimuth, tool face orientation, resistivity of drilling formations, etc. and converting the measurements to an electrical signals. See U.S. Pat. No. 3,309,656 for examples of electronic packages that may be used in the present invention. The circuitry in electronic package 30, in response to the signal from sensors, allows a defined amount of power from an electric power generator 32 located in housing 14 to flow to brake 34 in compartment 24 for variably slowing the rotation speed of the shaft 18 which is connected to the centrifugal impeller 16. Several methods for performing the braking function can be employed. For example, braking can be accomplished by electrical, hydraulic or magnetic brakes, or the generator 32 could be used for braking purposes. Generator 32 is driven by shaft 18 and generates electric power for operating the brake 34 and electronic package.

It is thus easily seen that since centrifugal impeller 16 is directly in the path of the drilling fluid flow, by momentarily substantially increasing its resistance to rotation and reducing rotor RPM, a substantial pressure pulse is created in the flowing mud, which pressure pulse is transmitted through the mud to the surface where it is detected by well known modern techniques for extraction and conversion into useable and readable format.

When it is desired to gather and to transmit downhole information, a pressure pulse may be transmitted downhole, as described in U.S. Pat. No. 4,078,620, for example, it being understood that the downhole electronic package 30 is provided with the appropriate instrumentation as described in this patent which also describes the surface detection equipment. As long as the mud flows through the string, as is the normal case in the operation of the present invention, mud also flows through the drill bit 20. In other words, the flow of mud is continuous through the drill string and the drill bit and the drilling need not be stopped, nor does the transmission of data result in diversion of portion of mud flow (negative mud pulse systems) to the annulus.

If pressure pulses of greater amplitude are desired, multiple centrifugal impellers 16 can be configured in series, thereby providing multiple turbine stages, which cumulatively results in the generation of higher amplitude pressure plates. However, such a configuration will result in a data transmission device of larger axial dimensions.

Figure 5:
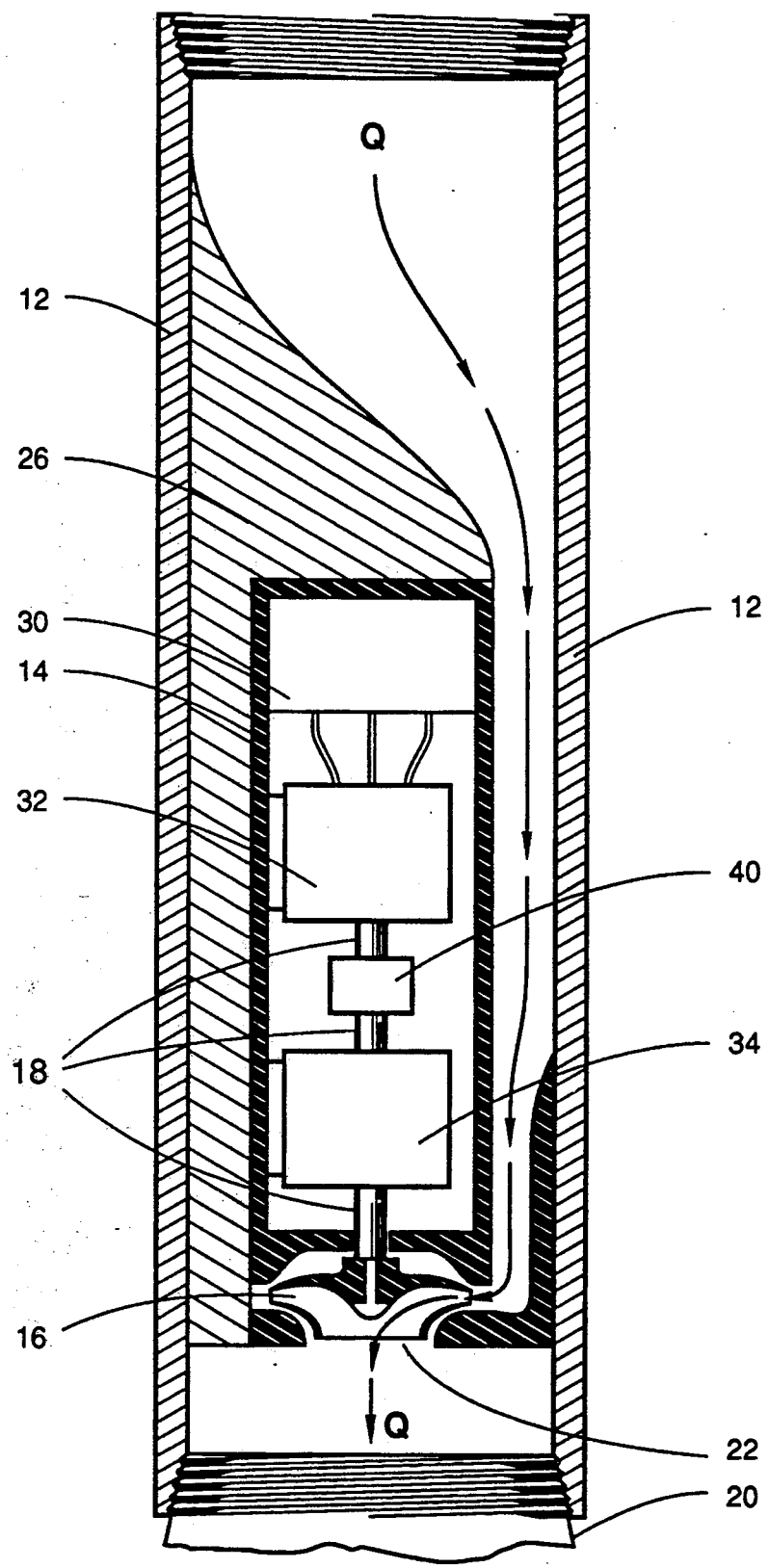
FIG. 5 is a schematic, partly in section, of a portion of the drill string, having an alternate embodiment of the present borehole data transmission apparatus mounted therein.

Referring now to FIG. 5, where like elements are given like numbers to that of FIG. 4, an alternative embodiment of the present invention is shown. The downhole data transmission apparatus includes a clutch mechanism 40 positioned about the rotating shaft between the brake 34 and the generator. The clutch mechanism permits the disengagement of the generator 32 from the torsionally loading of the rotating shaft and reducing thereby the moment of inertia of the rotating shaft. By disengaging the generator from the rotating shaft, the frequency of the generated pressure pulses can be increased thereby increasing the data transmission rate. In such an event, downhole assembly must utilize a small battery block (not shown) to provide energy for the telemetry systems while pulsing.

The foregoing description of a preferred embodiment of the invention has been presented for purposed of illustration and description. It is not intended to be exhaustive or to limit the invention to the precise form disclosed, and obviously many modifications and variations are possible in light of the above teaching. The embodiments described explain the principles of the invention and practical application and enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A downhole data transmission device for use in an earth drilling apparatus comprising:
   a housing positioned in a drill string, said drill string receiving a flow of drilling fluid,
   a shaft journaled in said housing;
   means for directing said drilling fluid between said housing and drill string to rotating impellers mounted on said shaft and driven by said flowing drilling fluid, said rotating impellers directing the drilling fluid radially inward in said drill string to a drill bit positioned below said housing, said rotating impellers having a pressure response characteristic related to its rotational speed;
   means for changing the rotational speed of said rotating impellers while said drilling fluid flows therethrough in order to generate a pressure pulse which is transmitted through said drilling fluid.

2. The downhole data transmission device of claim 1 wherein said rotating impellers are comprised of centrifugal pump impellers, wherein the flow of said drilling fluid is directed in the outlet of said centrifugal pump and exits the centrifugal pump inlet to said drill bit.

3. The downhole data transmission device of claims 1 or 2 further comprising an electrical generator driven by said shaft for providing electrical power for operating said means for changing the rotational speed, wherein clutch means are provided for disengaging said generator during pulse data transmission.

4. The downhole data transmission device of claim 1 wherein said rotating impellers consists of a series of rotating impellers creating multiple turbine stages for generating pressure pulses through said drilling fluid.

* * * * *